US007616830B2

(12) United States Patent
Lebowsky et al.

(10) Patent No.: US 7,616,830 B2
(45) Date of Patent: Nov. 10, 2009

(54) METHOD AND DEVICE FOR REDUCING BLOCKING ARTIFACTS IN A COMPRESSED DIGITAL IMAGE WITHOUT REDUCING CLARITY OF EDGES

(75) Inventors: Fritz Lebowsky, Saint Martin D'uriage (FR); Marina Nicolas, Voreppe (FR)

(73) Assignee: STMicroelectronics S.A., Montrouge (FR)

( * ) Notice: Subject to any disclaimer, the term of this patent is extended or adjusted under 35 U.S.C. 154(b) by 502 days.

(21) Appl. No.: 11/320,165

(22) Filed: Dec. 28, 2005

(65) Prior Publication Data

US 2006/0171598 A1 Aug. 3, 2006

(30) Foreign Application Priority Data

Jan. 10, 2005 (FR) .................................. 05 00212

(51) Int. Cl.
*G06K 9/40* (2006.01)
*H04N 5/00* (2006.01)
(52) U.S. Cl. ...................... 382/268; 382/260; 382/275; 348/607
(58) Field of Classification Search ................ 382/268, 382/254, 260, 275; 348/241, 242, 439.1, 348/446, 448, 607
See application file for complete search history.

(56) References Cited

U.S. PATENT DOCUMENTS

| 4,941,045 | A | * | 7/1990 | Birch ......................... 348/448 |
| 5,357,282 | A | * | 10/1994 | Lee ........................... 348/403.1 |
| 5,784,499 | A | * | 7/1998 | Kuwahara et al. ........... 382/264 |
| 6,115,503 | A | * | 9/2000 | Kaup ......................... 382/268 |
| 2002/0186770 | A1 | * | 12/2002 | Jawerth et al. ......... 375/240.12 |

OTHER PUBLICATIONS

"Colour banding." Wikipedia. Article version published Oct. 19, 2004.*
Filliman et al. (Aug. 1992) "Interlace to progressive scan converter for IDTV." IEEE Trans. on Consumer Electronics, vol. 38 No. 3, pp. 135-144.*
de Haan, G., et al. (Sep. 1998) "Deinterlacing—an overview." Proc. of the IEEE, vol. 86 No. 9, pp. 1839-1857.*
"Interlace." (Nov. 2004) Wikipedia. http://en.wikipedia.org/wiki/Interlace.*
Samadani, et al., "Deringing and deblocking dct compresion artifacts with efficient shifted transforms," Image Processing, 2004; ICIP '04 2004 International Conference in Singapore, Oct. 24-27, 2004, Piscataway, NJ, USA; IEEE, vol. 3, Oct. 24, 2004, pp. 1799-1802; XP010786112; ISBN: 0-7803-8554-3, Section 2, pp. 1799-1801.

(Continued)

*Primary Examiner*—John B Strege
*Assistant Examiner*—Barry Drennan
(74) *Attorney, Agent, or Firm*—Gardere Wynne Sewell LLP

(57) ABSTRACT

Artifacts of an incident digital image including pixels carrying information are reduced by determining, for certain pixels being considered from the image, displaced pixels. A displaced pixel associated with a pixel being considered is situated at a location that is displaced with respect to the location of the pixel being considered. Substitution information is determined by taking into account the variations between each piece of information carried by pixels situated at locations adjacent to the pixel being considered. The pixel being considered is then selectively replaced by a substitution pixel equal to the displaced pixel or to a combination of the displaced pixel and the pixel being considered, depending on the value of the substitution information.

24 Claims, 4 Drawing Sheets

OTHER PUBLICATIONS

Nosratinia, A., "Denoising JPEG images by re-applicaiton of JPEG," Multimedia Signal Processing, 1998 IEEE Second Workshop, Redondo Beach, CA, USA, Dec. 7-9, 1998, Piscataway, NJ, USA, IEEE, Dec. 7, 1998, pp. 611-615, XP010318366; ISBN: 0-7803-919-9.

Derviaux, et al., "Blocking artifact reduction of CDT coded image sequences using a visually adaptive postprocessing," Proceedings of the International Conference on Image Processing (ICIP), Lausanne, Sep. 16-19, 1996, New York IEEE, US., vol. 1, pp. 5-8; XP010202580; ISBN: 0-7803-3259-8, Section 2.1.2, pp. 6-7.

Zhao, et al., "Postprocessing technique for blocking artifacts reduction in DCT domain," Electronics Letters, IEE Stevenage, GB, vol. 40, No. 19, Sep. 16, 2004, pp. 1175-1176; XP006022670; ISSN: 0013-5194.

J. Webb, "Postprocessing to reduce blocking artifats for low bit-rate video coding using chrominance information," Institute of Electrical and Electronics Engineers; Proceedings of the International Conference on Image Processing (ICIP), Lausanne, Sep. 16-19, 1996, New York, IEEE, US, vol. 1, pp. 9-12; XP010202581; ISBN: 0-7803-3259-8, Section 3, pp. 10-11.

Preliminary French Search Report, FR 05 00212, dated Jul. 29, 2005.

* cited by examiner

METHOD AND DEVICE FOR REDUCING BLOCKING ARTIFACTS IN A COMPRESSED DIGITAL IMAGE WITHOUT REDUCING CLARITY OF EDGES

PRIORITY CLAIM

The present application claims priority from French Application for Patent No. 05 00212 filed Jan. 10, 2005, the disclosure of which is hereby incorporated by reference.

BACKGROUND OF THE INVENTION

1. Technical Field of the Invention

The present invention relates to the processing of digital images, in particular the post-processing of digital images having been compressed by means of a compression standard requiring the division of the image into several blocks, such as for example the MPEG standard.

The invention can be advantageously applied to, but is not limited to, digital video applications using large-area screens, such as plasma screens.

2. Description of Related Art

In order to transmit or to store digital images for digital video applications, the image must be compressed by means of a compression standard. In order to facilitate the compression phase, the source of pixels is converted into coefficients by means of a transformation algorithm, such as for example the Discrete Cosine Transform (DCT) conventionally used in blocks of dimension 8*8. In order that the transmission or the storage of the image be optimal, the compression ratios can be very high, which leads to compression artifacts that are hardly visible on standard resolution screens, but that are significant on large-area and high-resolution screens.

Visually, the compression artifacts appear as an edge effect associated with the blocks generated during the transformation phase, together with the presence of noise generated by transient oscillations referred to as "ringing" or "mosquito noise."

In addition, without suitable processing to reduce these artifacts, the use of normal decoders leads to the loss of fidelity in some colors.

A need accordingly exists to provide a solution to these problems.

SUMMARY OF THE INVENTION

According to an embodiment of the invention, a method is presented for reducing the artifacts of an incident digital image comprising pixels carrying information.

This information can, for example, correspond to three bytes for each of the components of the Red-Green-Blue (RGB), Color-luminance Color-red Color-blue (YCrCb) or Hue-Luminance-Saturation (HLS) storage formats.

According to a general feature of this embodiment of the invention, the method comprises determining, for certain pixels being considered from the image, displaced pixels. A displaced pixel associated with a pixel being considered is situated at a location that is displaced with respect to the location of the pixel being considered. Then, determining a substitution information taking into account the variations between each piece of information carried by pixels situated at locations adjacent to the pixel being considered. Next, replacing (or not) of the pixel being considered by a substitution pixel equal to the displaced pixel or to a combination of the displaced pixel and the pixel being considered, depending on the value of the substitution information.

In other words, certain pixels of the incident image are replaced by pixels called displaced pixels, in other words a pixel belonging to the incident image other than the pixel initially situated in this location. The substitution is carried out if the substitution information meets certain conditions, for example that the region neighboring the pixel that could be replaced by a displaced pixel be visually uniform. Indeed, if this neighboring region is visually uniform, the substitution of the original pixel by a displaced pixel will not be visible when the image is displayed.

One advantage of this method is the significant reduction in the artifacts, and especially the effects referred to as "block effects," by breaking up the block structures created during the compression phase for the transfer or storage of the image.

Furthermore, the examination of the possible replacement of the pixel being considered advantageously comprises the comparison of the substitution information with a first and second threshold. In addition, the pixel being considered is preferably conserved if the substitution information is greater than or equal to the first threshold. On the other hand, the pixel being considered is replaced by the substitution pixel if the substitution information is less than the first threshold, the nature of the substitution pixel then depending on the result of the comparison between the substitution information and the second threshold.

According to one embodiment, the substitution pixel is preferably equal to the displaced pixel if the substitution information is less than the second threshold, and is equal to a weighted sum of the pixel being considered and of the displaced pixel if the substitution information is greater than the second threshold.

According to one embodiment of the invention, each displaced location is displaced from the corresponding location of the pixel being considered by a shift corresponding to a displacement along two orthogonal axes of the image, of amplitudes n and m, respectively, at least one of the amplitudes m or n being non-zero.

According to one embodiment, the determination of the substitution information relating to a pixel being considered can advantageously comprise a filtering of the information carried by the pixels situated at the locations adjacent to the pixel being considered, and the summing of the filtered information.

Preferably, displaced pixels are determined for one pixel in two of the incident image, and by the fact that the sum of the amplitudes of the displacement along the two orthogonal axes is even.

This checkered structure is that which allows the block structure to be maximally broken up.

Another subject of the invention is an embodiment of a device for reducing the artifacts of an incident digital image composed of pixels carrying information.

According to a general feature of this embodiment, the device comprises determination means capable of determining displaced pixels, for certain pixels being considered from the image, a displaced pixel associated with a pixel being considered being situated at a location that is displaced with respect to the location of the said pixel being considered, calculation means capable of determining a substitution information by taking into account the variations between each piece of information carried by pixels situated at locations adjacent to the said pixel being considered, and a substitution means capable of replacing or not the pixel being considered by a substitution pixel equal to the displaced pixel or to a combination of the displaced pixel and the pixel being considered, depending on the value of the said substitution information.

According to one embodiment of the invention, the device comprises a memory capable of storing the pixels of the incident image. In addition, the determination means can comprise means for addressing the said memory, capable of delivering a first address corresponding to the location of the pixel being considered and a second address corresponding to the displaced location of the displaced pixel associated with the said pixel being considered, such that each displaced location is displaced from the location corresponding to the pixel being considered by a shift corresponding to a displacement along two orthogonal axes of the image, of amplitudes n and m, respectively, at least one of the amplitudes m or n being non-zero.

Preferably, all the first addresses can correspond to one pixel in two of the incident image, and the sum of the amplitudes of the displacement along the two orthogonal axes is even.

Furthermore, according to one embodiment of the invention, the addressing means can comprise: a first pair of counters assigned to one axis of the image and mutually displaced as a function of the said displacement along this axis, a second pair of counters assigned to the other axis of the image and mutually displaced as a function of the said displacement along this other axis, a first multiplexer whose two inputs are respectively connected to the first pair of counters, a second multiplexer whose two inputs are respectively connected to the second pair of counters, and an adder connected to the outputs of the two multiplexers and delivering an address pointing to a memory location at the output.

According to one embodiment of the invention, the calculation means of the device can comprise: means capable of filtering information carried by the pixels situated at the locations adjacent to the pixel being considered, and summation means capable of summing filtering information, the said summation means delivering the said substitution information.

According to one embodiment of the invention, the substitution means advantageously comprises: comparison means capable of comparing substitution information with a first and a second threshold, and mixing means receiving the pixel from the incident image and, as the case may be, the corresponding displaced pixel, and delivering the incident pixel being considered or the substitution pixel for this incident pixel depending on the result of the comparison means.

Furthermore, another subject of the invention is a screen format system comprising a screen, for example a Plasma screen, designed to display a digital image and a device as is defined hereinabove.

In accordance with another embodiment, a method comprises receiving an incident digital image pixel matrix and generating two virtual sub-image pixel matrices from the incident digital image pixel matrix. An output digital image pixel matrix is then generated which comprises a first group of pixels taken from a first one of the virtual sub-image pixel matrices plus a second group of pixels selectively taken from one of the incident digital image pixel matrix and a second one of the virtual sub-image pixel matrices.

In accordance with another embodiment, a method for processing a received digital image which includes pixels comprises identifying certain pixels within the received digital image for direct inclusion in an output digital image. The received digital image is displaced by a certain distance to create a displaced digital image. For each certain pixel location in the output digital image not containing directly included pixels from the received digital image, a substitution factor is determined which takes into account variations between that certain pixel location and adjacent pixel locations. Based on the determined substitution factor, one of a pixel from the received digital image, a pixel from the displaced digital image or a pixel which is a combination of pixels from the received and displaced digital images is selectively chosen as the pixel at that certain pixel location.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE PREFERRED EMBODIMENTS

Figure 1:
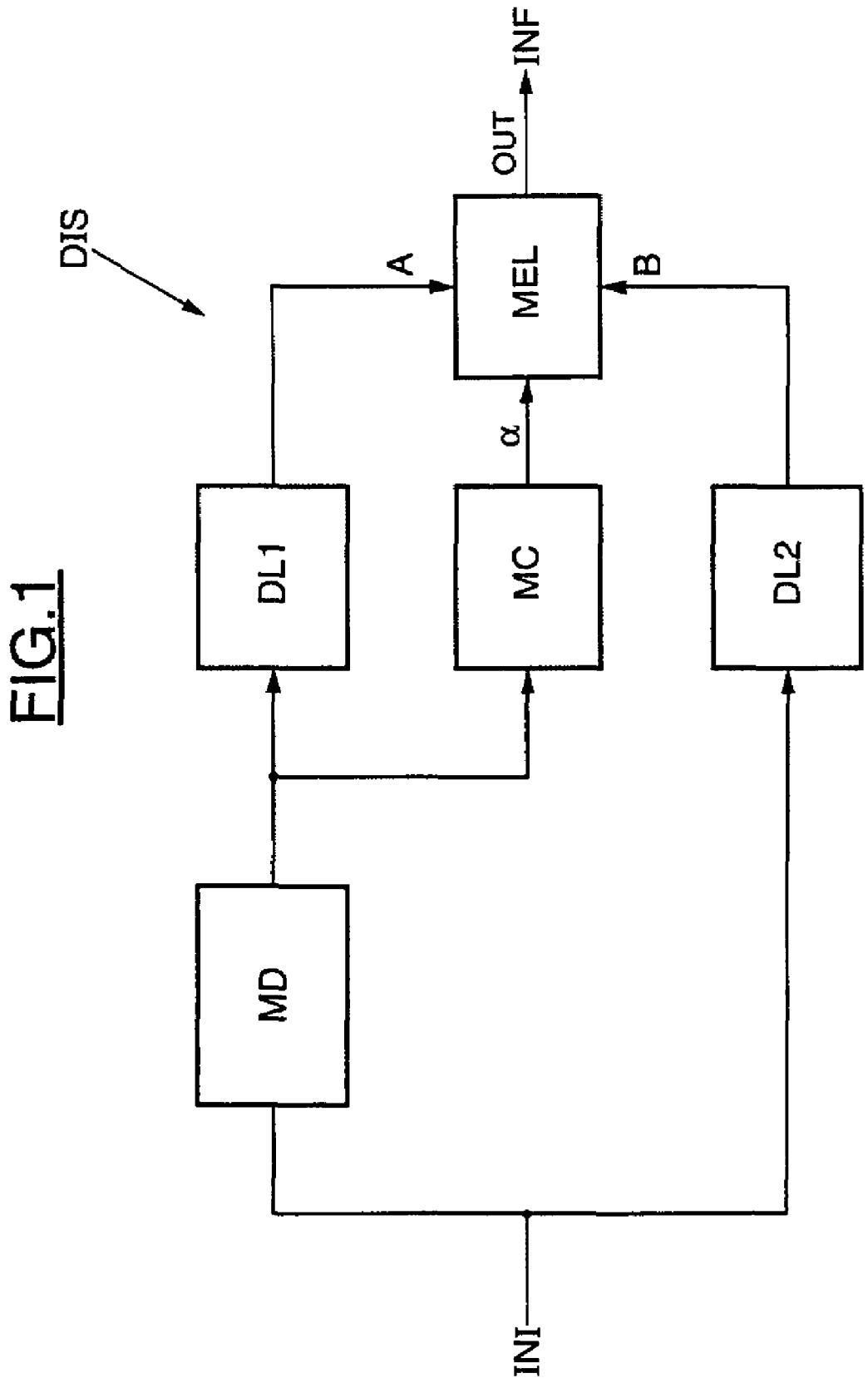
FIG. 1 shows one embodiment of the device according to the invention.

In FIG. 1, one embodiment of a device DIS according to the invention is shown.

The device DIS shown is situated at the end of a digital image transmission system, so as to perform a post-processing on the image that, prior to that, has been compressed, transmitted, then decompressed by the various processing modules of the transmission system (not shown).

The reference INI denotes an incident digital image delivered to the device DIS at the output of the decompression phase. The image INI is delivered pixel by pixel to determination means MD. These determination means MD will allow pixels, called "displaced" pixels, to be determined for certain pixels, for example one pixel in two, from the incident image.

In other words, the determination means MD will allow two virtual sub-images to be constructed, a first virtual sub-image being formed from one part of the incident image pixels, and a second virtual sub-image being formed from the pixels that are complementary to the first virtual sub-image and shifted by a given displacement.

This displacement can, for example, correspond to a translation along the orthogonal axes of the image, of respective amplitudes n and m, whose sum n+m is even and non-zero. A precise mode of operation of the determination means MD will be detailed hereinafter.

The pixels of the two virtual sub-images are respectively delivered to a delay unit DL1 and to calculation means MC connected to the output of the determination means MD.

In parallel with the delay unit DL1, the device DIS also comprises a second delay unit DL2 receiving at the input, pixel by pixel, the pixels of the incident digital image INI.

The delay units DL1 and DL2 are in this example used to allow the shifting of the pixels to be shifted, and the synchronization of the output.

The object of the calculation means MC is to detect whether the region of the pixels adjacent to the pixel being considered in the incident image is sufficiently uniform to authorize the substitution of the pixel being considered. For that purpose, the calculation means can for example use a filter of the gradient type, such as:

$$Gradout = Abs \begin{bmatrix} 1 & -1 & 1 \\ -1 & 0 & -1 \\ 1 & -1 & 1 \end{bmatrix}_r + Abs \begin{bmatrix} 1 & -1 & 1 \\ -1 & 0 & -1 \\ 1 & -1 & 1 \end{bmatrix}_g +$$

$$Abs \begin{bmatrix} 1 & -1 & 1 \\ -1 & 0 & -1 \\ 1 & -1 & 1 \end{bmatrix}_b$$

More precisely, if a pixel with coordinates (x, y) is considered, the contribution of the red component in the value of Gradout is:

$Abs(pixel(x,y))r$=absolute value$(in(x-1,y-1)-in(x,y-1)+in(x+1,y-1)-in(x-1,y)-in(x+1,y)+in(x-1,y+1)-in(x,y+1)+in(x+1,y+1))$ where in(x,y) represents the value of the red component for the pixel of coordinates (x,y).

In the example cited, a zero weighting is assigned to the central pixel of the filter, which is the pixel being considered, in order to study the variations within the region surrounding this pixel and avoid the multiplications in the calculation.

The region is considered as sufficiently uniform if the sum Abs(pixel (x,y)) of the coefficients at each filter for each RGB component is close to zero.

Of course, other digital filters may be used for analyzing the uniformity of the region surrounding the pixel being considered.

The calculation means MC therefore deliver a value α at the output that corresponds to the value delivered by the normalized gradient filter Gradout, in other words α=Gradout*norme where the value of the normalizing parameter norme depends on the filters used in the calculation means.

Thus, α is a factor varying from 0 to 1. Its variations will be described in more detail hereinafter.

The values supplied by the various units DL1, MC and DL2, respectively A, α and B, are delivered to a mixer MEL whose objective is to deliver a pixel forming part of the final digital image INF, depending on the substitution information α.

The information A received by the mixer MEL corresponds to a pixel of the incident digital image INI or else to a displaced pixel. As regards the information B, this corresponds to a pixel of the incident digital image INI.

In the case where the information A corresponds to a pixel of the incident digital image INI, the output OUT of the mixer MEL systematically corresponds to an initial pixel of the incident image INI.

In the case where the information A corresponds to a pixel displaced by the determination means MD, the information OUT can be equal to three different types of pixels depending on the value taken by the substitution information α, namely the pixel being considered, the displaced pixel or a sum weighted by α of these two pixels, according to the following equation:

$OUT=(1-\alpha)*A+\alpha*B$

The conditions for substitution of the pixel being considered from the incident digital image INI will be described in more detail hereinafter.

Figure 2:
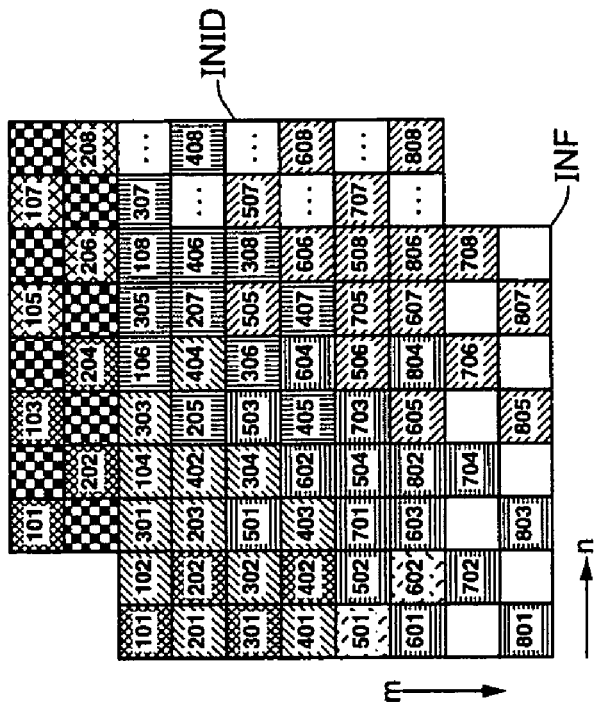
FIG. 2 shows an exemplary embodiment of the artifact reduction method according to the invention.
Figure 2:
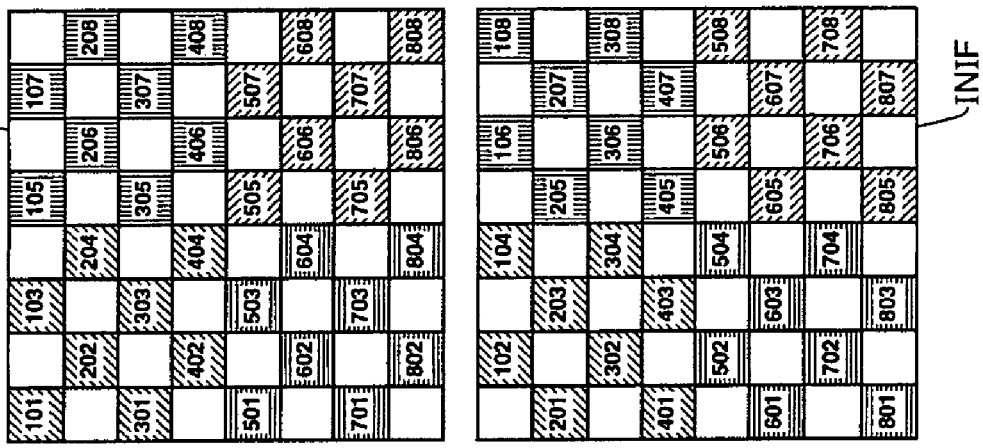
Figure 2:
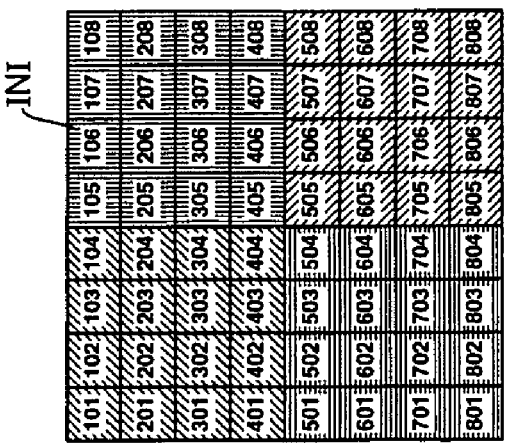

Reference is now made to FIG. 2, which illustrates in more detail, for certain pixels being considered from the image, the determination of the displaced pixels.

During a first step, the incident digital image INI, comprising in this example 8 rows and 8 columns of pixels numbered from 1 to 8 for the columns and from 100 to 800 for the rows, is considered. The reference INI could also represent an 8*8 block extracted from a incident image.

For this example, the incident digital image INI comprises four distinct regions represented by four different frames.

During a second step, two virtual sub-images INIF and INID are generated. The first virtual sub-image INIF comprises one pixel in two from the incident digital image INI. The second virtual sub-image INID is a sub-image that is complementary to the first sub-image INIF. In addition, each of the pixels of the second virtual sub-image INID is displaced by a given displacement with respect to its location within the incident image. This displacement comprises, in this example, in incrementing the abscissa of each pixel by n=2 and the ordinate of each pixel by m=200.

During a third step, the final digital image INIF is reconstituted by associating the two sub-images INIF and INID as a function of the value of the substitution information α.

Thus, the final digital image INF comprises the first virtual sub-image INIF, then, for each pixel missing from the first sub-image INIF, a substitution pixel belonging either to the second displaced sub-image INID, or to the initial digital image if the substitution has not been authorized by the substitution information α. Thus, for example, the final digital image INF comprises the initial pixel number 102, then, in place of the initial pixel 103, the pixel 301 from the second displaced virtual sub-image INID which is at the location of the pixel 103 following the displacement of the second sub-image INID.

For the pixels located at the edges of the final digital image INF, given that a substitution with pixels belonging to the second displaced virtual sub-image INID cannot be made, the pixels missing from the final digital image INF are completed by the initial pixels from the incident digital image INI. Thus, for example, the pixel 101 is conserved in the final digital image INF.

Figure 3:
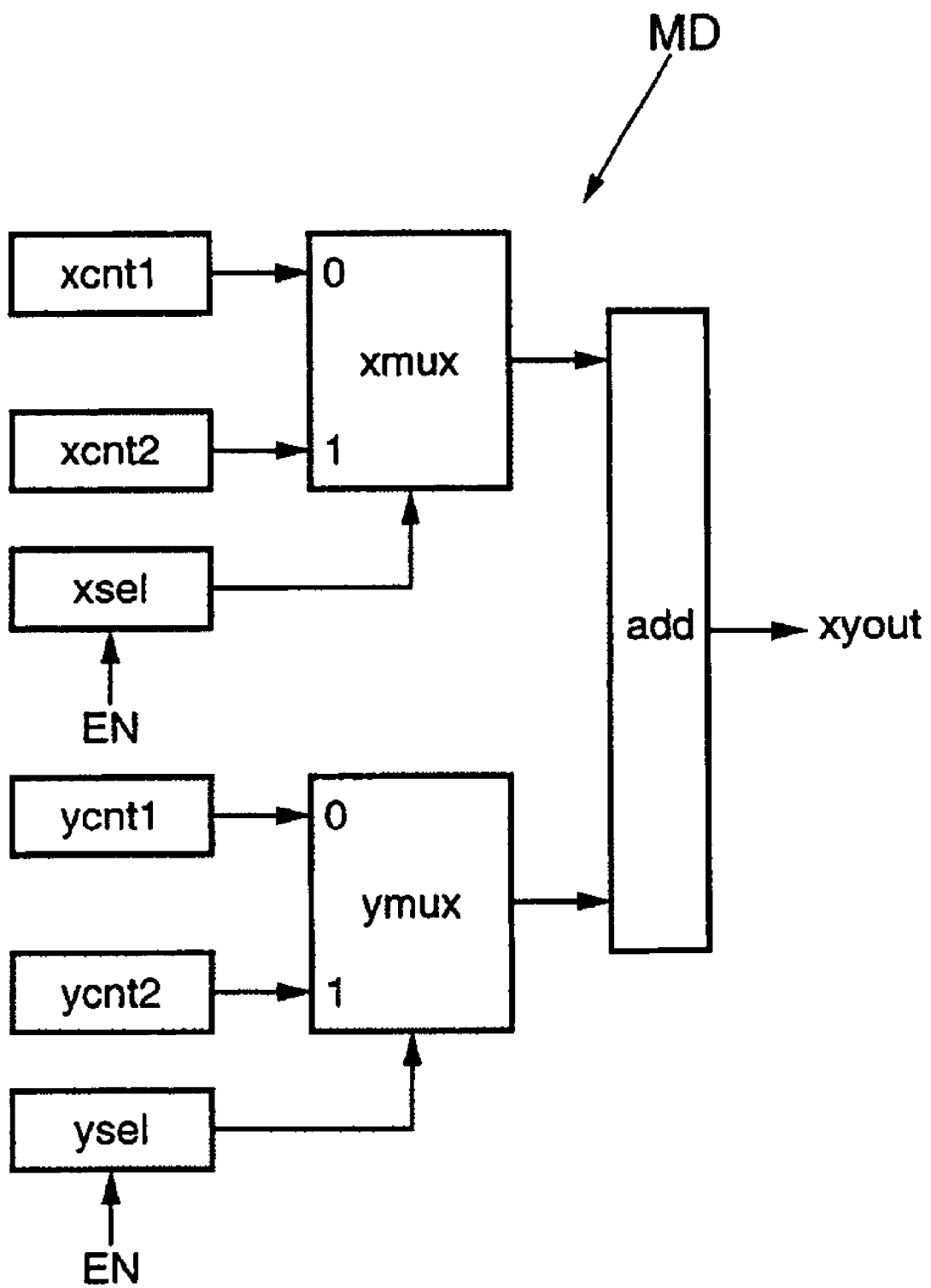
FIG. 3 shows one embodiment of a part of the device according to the invention.

Reference is now made to FIG. 3, which represents one embodiment of the determination means.

In order to successively deliver the pixels belonging to the first virtual sub-image and to the second virtual sub-image, the determination means timed by a clock (not shown) comprise two multiplexers xmux and ymux, each being assigned to one axis of the image, the abscissa axis and the ordinate axis, respectively.

The outputs of the multiplexers xmux and ymux are connected to an adder add, which delivers at its output the address xyout corresponding to the number of the pixel delivered by the information A to the mixer MEL.

The inputs of the first multiplexer xmux are respectively connected to a pair of counters xcnt1 and xcnt2, the second counter xcnt2 being displaced with respect to the first counter xcnt1 by the displacement along the abscissa axis, equal to 2 in this example.

The first pointer xmux also receives at its input a control variable xsel, alternatively taking the values "0" and "1", so as to connect the output of the multiplexer xmux to one or the other of its inputs.

In the case where the edge of the image is processed, a variable EN controlling the value of xsel takes the value "0", forcing the value of xsel to "0". The multiplexer xmux then delivers the value received at its first input, so as to form the address of a pixel belonging to the initial image.

In a similar manner as for the first multiplexer, the inputs of the second multiplexer ymux are respectively connected to a second pair of counters ycnt1 and ycnt2, the second counter ycnt2 being displaced with respect to the first counter ycnt1 by the displacement along the ordinate axis, equal to 200 in this example.

The second multiplexer ymux also receives at its input a control value ysel controlled by the variable EN such that the case of the edge of the image is processed in the same manner as for the first multiplexer xmux.

The adder add performs the sum of the values delivered by the first and the second multiplexer xmux and ymux, so as to form the address of the pixel to be delivered at the output.

This address will allow the determination means MD to go and point to the pixel designated by the address xyout stored in a memory (not shown) associated with the device DIS.

Another means for generating the two virtual sub-images would comprise using two masks by means of two filters that would mask one pixel in two from the incident digital image.

Figure 4:
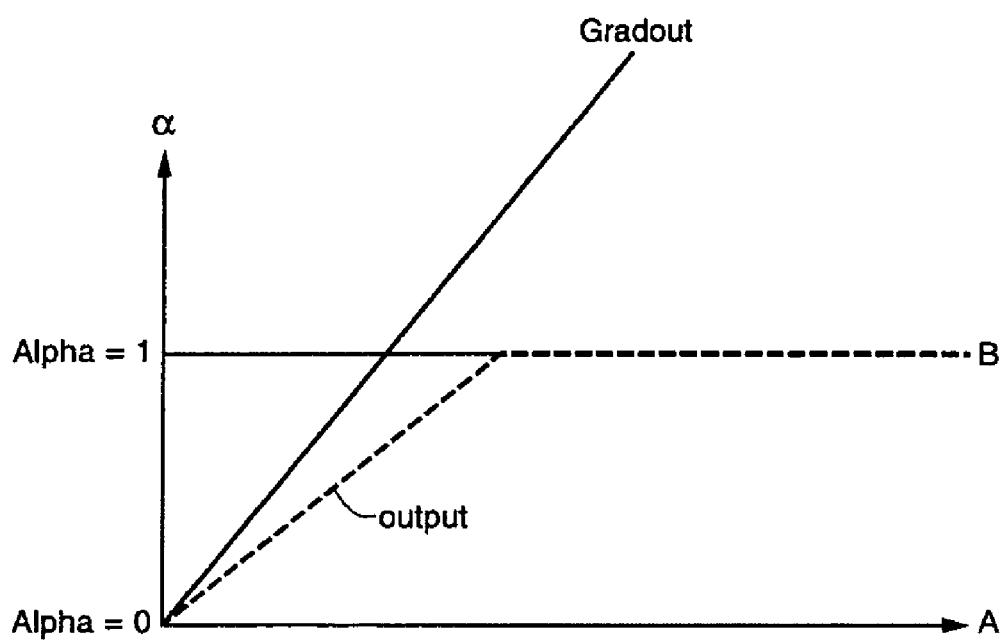
FIGS. 4 and 5 illustrate an example of formation of the final digital image according to the invention, as a function of the value of the substitution information.

Reference is now made to FIG. 4, which describes more precisely the variation of the substitution information allowing the replacement or not of the pixel being considered by the substitution pixel.

The curve in FIG. 4 shows the behavior of the output variable OUT of the mixer MEL as a function of the values taken by a which varies linearly with respect to Gradout.

As a variant, curves of the substitution information a that are not a linear function of Gradout could be considered.

If the information A contains a displaced pixel, capable of replacing a pixel being considered from the incident digital image, and the substitution information $\alpha$ is equal to 0, then the substitution is authorized and the pixel delivered at the output for forming the final digital image is equal to the displaced pixel.

In the case where $\alpha$ is in the range between 0 and 1, the pixel delivered by the mixer is equal to a sum weighted by a of the pixel contained in the information A and of the pixel contained in the information B.

Lastly, in the case where $\alpha$ is equal to 1, the substitution is then disallowed and the pixel being considered from the incident digital image is conserved. The pixel delivered at the output is then equal to the pixel contained in the information B.

Figure 5:
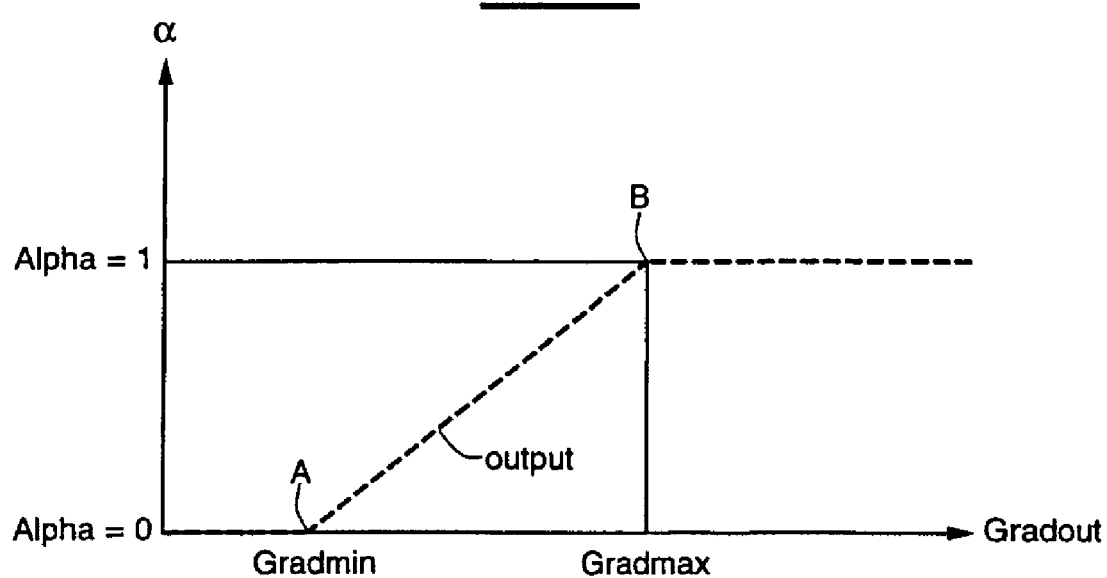

The example shown in FIG. 4 corresponds to an ideal case. In practice, as illustrated in FIG. 5, thresholds exist that are respectively a first threshold Gradmin and a second threshold Gradmax. If Gradout is less than Gradmin, then the pixel being considered from the incident digital image is replaced by the displaced pixel determined by the determination means MD.

If Gradout is greater than the threshold Gradmax, then the initial pixel from the incident digital image INI is conserved for generating the final digital image INF.

If Gradout is in the range between these two thresholds, then the pixel of the final digital image INF is equal to the weighted sum of the pixel being considered from the incident digital image and of the displaced pixel corresponding to the pixel being considered.

In the case where the permutation is not authorized, since the pixel is for example at the edge of the image, the information A and information B designate the same pixel and the value of the substitution information $\alpha$ is then irrelevant.

Furthermore, the values of the gradient thresholds Gradmin and Gradmax may be controlled as a function of the parameters of the decoders employed, if the capability exists.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method, comprising:
    parsing an incident digital image comprising an incident x by y array of image pixels into a first x by y sub-array of pixels that includes a first group of image pixels from the incident x by y array and a second x by y sub-array of pixels that includes a second group of image pixels from the incident x by y array that are different from the first group;
    displacing the second x by y sub-array relative to the first x by y sub-array by m vertical pixel locations and n horizontal pixel locations;
    reconstituting a final x by y array of pixels for an output digital image to include first group image pixels at their corresponding locations from the first x by y sub-array of pixels and second group image pixels at their corresponding displaced locations from the second x by y sub-array of image pixels selectively chosen as a function of a substitution information value; and
    determining the substitution information value by determining whether the image pixels in the incident digital image situated at locations adjacent to a pixel location in the final x by y array being considered are sufficiently uniform, and
    wherein reconstituting comprises choosing either a second group image pixel from the displaced second x by y sub-array of pixels or a substitution pixel determined from a weighted combination of the second group image pixel and a correspondingly located image pixel from of the incident x by y array depending on the value of the substitution information;
    wherein x and y are both greater than 1, and m+n is even and non-zero.

2. The method according to claim 1, further comprising comparing the substitution information value with a first and second threshold, and wherein reconstituting comprises choosing the correspondingly located image pixel from the incident x by y array if the result of the comparison is greater than or equal to the first threshold, and wherein reconstituting comprises choosing the substitution pixel if the result of the comparison is less than the first threshold.

3. The method according to claim 1, further comprising comparing the substitution information value with a first and second threshold, and wherein reconstituting comprises choosing the displaced pixel from the displaced second x by y sub-array of pixels if the substitution information value is less than the second threshold, and wherein reconstituting comprises choosing the weighted combination substitution pixel if the substitution information is greater than the second threshold.

4. The method according to claim 1, wherein determining the substitution information value relating to a pixel being considered comprises:
    filtering of the information carried by the pixels situated at the locations adjacent to the pixel being considered, and summing of the filtered information.

5. A device, comprising:
    determination means for parsing an incident digital image comprising an incident x by y array of image pixels into a first x by y sub-array of pixels that includes a first group of image pixels from the incident x by y array and a second x by y sub-array of pixels that includes a second group of image pixels from the incident x by y array that are different from the first group, means for displacing the second x by y sub-array relative to the first x by y sub-array by m vertical pixel locations and n horizontal pixel locations, calculation means for determining a substitution information value by determining whether the image pixels in the incident digital image situated at locations adjacent to a pixel location in a final x by y array being considered are sufficiently uniform, and substitution means for reconstituting the final x by y array of pixels of a final digital image to include first group image pixels at their corresponding locations from the first x by y sub-array of pixels and second group image pixels at their corresponding displaced locations from the second x by y sub-array of image pixels selectively chosen as a function of a substitution information value, wherein reconstituting comprises choosing either a second group image pixel from the displaced second x by y sub-array of pixels or a substitution pixel determined from a weighted combination of the second group image pixel and a correspondingly located image pixel from the incident x by y array depending on the value of the substitution information;

wherein x and v are both greater than 1, and m+n is even and non-zero.

6. The device according to claim 5, farther comprising a memory for storing the pixels of the incident image, and wherein the determination means comprise means for addressing the memory capable of delivering a first address corresponding to the location of the pixel being considered and a second address corresponding to the displaced location of the displaced pixel associated with the pixel being considered.

7. The device according to claim 6, characterized in that the addressing means comprise:
- a first pair of counters assigned to one axis of the image and mutually displaced as a function of the said displacement along this axis,
- a second pair of counters assigned to the other axis of the image and mutually displaced as a function of the said displacement along this other axis,
- a first multiplexer whose two inputs are respectively connected to the first pair of counters,
- a second multiplexer whose two inputs are respectively connected to the second pair of counters, and
- an adder connected to the outputs of the two multiplexers and delivering an address pointing to a memory location at the output.

8. The device according to claim 6, characterized in that the calculation means comprise:
- means capable of filtering information carried by the pixels situated at the locations adjacent to the pixel being considered, and
- summation means capable of summing filtering information, the summation means delivering the substitution information.

9. The device according to claim 6, characterized in that the substitution means comprises:
- comparison means capable of comparing substitution information value with a first and a second threshold, and
- mixing means receiving the pixel from the incident image and the corresponding displaced pixel, and delivering the incident pixel being considered or the substitution pixel for this incident pixel depending on the result of the comparison means.

10. The device according to claim 5 wherein the device is a component of a screen format system including a screen designed to display a digital image.

11. A method, comprising:
receiving an input pixel matrix for an incident digital image;

generating two virtual sub-image pixel matrices from the incident digital image pixel matrix, a first virtual sub-image pixel matrix including incident image data at a first set of pixel locations and no data at a second set of pixel locations, a second virtual sub-image pixel matrix including incident image data at the second set of pixel locations and no data at the first set of pixel locations;

displacing the second virtual sub-image pixel matrix relative to the first virtual sub-image pixel matrix by m vertical pixel locations and n horizontal pixel locations; and generating an output pixel matrix for an output digital image which comprises the incident image data at the first set of pixel locations from the first virtual sub-image pixel matrix and with respect to the second set of pixel locations having no data from the first virtual sub-image pixel matrix comprises image data taken from a substitution pixel wherein the substitution pixel is one of: a pixel at a corresponding displaced location in the second virtual sub-image matrix or a weighted combination of the pixel from the incident digital image pixel matrix and the pixel at the corresponding displaced location in the second virtual sub-image matrix;

wherein x and v are both greater than 1, and m+n is even and non-zero.

12. The method of claim 11 wherein the first virtual sub-image pixel matrix comprises alternating pixels from the incident digital image pixel matrix and the second virtual sub-image pixel matrix comprises opposite alternating pixels from the incident digital image pixel matrix, and wherein generating the output digital image comprises choosing, for a pixel within the first virtual sub-image pixel matrix at the second set of pixel locations having no data, a correspondingly located pixel from one of the incident digital image pixel matrix and the displaced second virtual sub-image pixel matrix.

13. The method of claim 11 wherein the first virtual sub-image pixel matrix comprises alternating pixels from the incident digital image pixel matrix and the second virtual sub-image pixel matrix comprises opposite alternating pixels from the incident digital image pixel matrix, and wherein generating the output digital image comprises calculating, for a pixel within the first virtual sub-image pixel matrix at the second set of pixel locations having no data, a pixel whose value is from the weighted average of correspondingly located pixels from the incident digital image pixel matrix and the displaced second virtual sub-image pixel matrix.

14. The method of claim 11 further comprising:
calculating a degree to which pixels adjacent to a certain pixel in the second set of pixel locations having no data are uniform; and choosing the substitution pixel based on the calculated degree of uniformity.

15. The method of claim 14 wherein choosing comprises:
selecting pixels from the incident digital image pixel matrix for a first calculated degree of uniformity range;

selecting pixels from the second virtual sub-image pixel matrix for a second calculated degree of uniformity range; and selecting a weighted averaging of pixels from the incident digital image pixel matrix and the second virtual sub-image pixel matrix for a third calculated degree of uniformity range.

16. A method for processing a received digital image which includes pixels, comprising:
identifying certain pixels within the received digital image for direct inclusion at corresponding first pixel locations in an output digital image;
displacing the received digital image by m vertical pixel locations and n horizontal pixel locations to create a displaced digital image;
determining, for second pixel locations in the output digital image not containing directly included pixels from the received digital image, a substitution factor which takes into account variations in information at pixel locations surrounding that second pixel location; and
selectively choosing for each second pixel location, based on the determined substitution factor at that second pixel location, one of a) a pixel from the received digital image at a corresponding pixel location to the second pixel location, b) a pixel from the displaced digital image at a pixel location displaced by the m vertical and n horizontal pixel locations from the second pixel location or c) a pixel which is a combination of a pixel from the received digital image at a corresponding pixel location to the second pixel location and a pixel from the displaced digital image at a pixel location displaced by the m vertical and n horizontal pixel locations from the second pixel location;
wherein m+n is even and non-zero.

17. The method of claim 16 wherein determining comprises performing a gradient filtering of the information carried by the pixels.

18. The method of claim 16 wherein determining comprises:
calculating a degree to which pixels adjacent to a certain pixel at issue are uniform; and
identifying the substitution factor as a measure of the calculated degree of uniformity.

19. The method of claim 16 wherein selectively choosing comprises:
selecting pixels from corresponding pixel locations in the received digital image if the substitution factor is within a first value range;
selecting pixels from corresponding displaced pixel locations in the displaced digital image if the substitution factor is within a second value range; and
selecting a weighted averaging of correspondingly located pixels from the received and displaced digital images if the substitution factor is within a third value range.

20. A method, comprising:
receiving an input pixel matrix for an incident digital image;
generating two virtual sub-image pixel matrices from the incident digital image pixel matrix, wherein:
a first virtual sub-image pixel matrix includes incident image data at a first set of pixel locations and no data at a second set of pixel locations, and
a second virtual sub-image pixel matrix includes incident image data at the second set of pixel locations and no data at the first set of pixel locations;
shifting the second virtual sub-image pixel matrix by m vertical pixel locations and n horizontal pixel locations with respect to the first virtual sub-image pixel matrix; and
generating an output pixel matrix for an output digital image by overlying the vertical and horizontal pixel location shifted second virtual sub-image pixel matrix on the first virtual sub-image pixel matrix such that horizontally and vertically displaced incident image data at the second set of pixel locations from the second virtual sub-image pixel matrix fills correspondingly located no data second set of pixel locations of the first virtual sub-image pixel matrix;
wherein m+n is even and non-zero.

21. The method of claim 20 further comprising calculating a substitution information value for each no data second set of pixel locations of the first virtual sub-image pixel matrix, and wherein generating comprises filling the no data second set of pixel locations of the first virtual sub-image pixel matrix with incident image data at the corresponding horizontally and vertically displaced second set of pixel locations from the second virtual sub-image pixel matrix if the calculated substitution information value satisfies a threshold.

22. The method of claim 21 further comprising, if the calculated substitution information value does not satisfy the threshold, filling the no data second set of pixel locations of the first virtual sub-image pixel matrix with incident image data at the correspondingly located pixel locations from the incident digital image pixel matrix.

23. The method of claim 21 further comprising, for no data second set of pixel locations of the first virtual sub-image pixel matrix not filled from the second virtual sub-image pixel matrix, filling those no data second set of pixel locations with incident image data at the correspondingly located pixel locations from the incident digital image pixel matrix.

24. The method of claim 21 further comprising, if the calculated substitution information value does not satisfy the threshold, filling the no data second set of pixel locations of the first virtual sub-image pixel matrix with a weighted combination of incident image data at the corresponding horizontally and vertically displaced second set of pixel locations from the second virtual sub-image pixel matrix and incident image data at the correspondingly located pixel locations from the incident digital image pixel matrix.

* * * * *

UNITED STATES PATENT AND TRADEMARK OFFICE
CERTIFICATE OF CORRECTION

PATENT NO. : 7,616,830 B2
APPLICATION NO. : 11/320165
DATED : November 10, 2009
INVENTOR(S) : Lebowsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 720 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,616,830 B2 | Page 1 of 1 |
| APPLICATION NO. | : 11/320165 | |
| DATED | : November 10, 2009 | |
| INVENTOR(S) | : Fritz Lebowsky et al. | |

It is certified that error appears in the above-identified patent and that said Letters Patent is hereby corrected as shown below:

In the claims:

At column 9, claim number 6, line number 14, please delete the word "farther" and replace with the word -- further --.

Signed and Sealed this
Thirty-first Day of May, 2011

David J. Kappos
*Director of the United States Patent and Trademark Office*